United States Patent Office 3,812,025
Patented May 21, 1974

3,812,025
CROSSLINKING OR OLEFIN COPOLYMERS CONTAINING KETONE GROUPS USING HIGH ENERGY RADIATION
James Edwin Guillet, 31 Sagebrush Lane,
Don Mills, Ontario, Canada
No Drawing. Continuation of abandoned application Ser. No. 763,980, Sept. 30, 1968. This application Sept. 30, 1971, Ser. No. 185,447
Claims priority, application Great Britain, Oct. 4, 1967, 45,217/67
Int. Cl. B01j 1/10, 1/12
U.S. Cl. 204—159.14                 4 Claims

ABSTRACT OF THE DISCLOSURE

Olefin copolymers containing ketone groups are crosslinked by treatment with high energy radiation such as γ-rays or electron beams.

---

This is a continuation of application Ser. No. 763,980, filed Sept. 30, 1968 and now abandoned.

BACKGROUND OF THE INVENTION

(1) Field of the invention

This invention relates to methods of crosslinking olefin (i.e. mono-olefin) copolymers and to products produced thereby. The invention more particularly relates to the production of polyethylene films for shrink packaging.

(2) Description of the prior art

It is known that the properties of polyolefins such as polyethylene can be improved by treatment with high-energy radiation such as X-rays from a cobalt-60 source, or electron beams from a resonant transformer or linear accelerator. Films, fibres and molded articles of polyethylene, when treated with such radiation, tend to cross-link and this raises the melting or softening point of the resin and improves its heat resistance and other desirable properties such as resistance to stress crazing. It is also possible to make shrinkable plastic films by irradiation of the films with high-energy electrons for shrink-packaging. Polyethylene compositions used for insulation on electrical wiring can be irradiated to improve their heat resistance and resistance to stress crazing. These developments are the basis for a considerable number of commercial applications, but one of the problems is that relatively high doses of radiation are necessary in order to obtain the desired improvement in the properties of the polyolefin.

Polyolefins containing ketone groups have been known for many years. For example, U.S. Pat. 2,391,218 dated Dec. 18, 1945 of R. G. R. Bacon and R. B. Richards describes the copolymerization of ethylene and carbon monoxide to form a copolymer containing ketone groups in the backbone of the chain and probably also in short side chains. Polyolefins containing ketone groups in side chains can be prepared by copolymerization of ethylene or other olefins with monomers such as methyl-vinylketone or methyl-isopropenyl-ketone. However the inclusion of ketone groups in polyolefin chains can be a major cause of degradation of the polymer when the polymer is subjected to ultraviolet radiation (see Hartley and Guillet, "Macromolecules I," p. 165 (1968)). Consequently the uses of polyolefins containing ketone groups have been limited and precautions are normaly taken in polymerization to exclude ketone groups.

SUMMARY OF THE INVENTION

Although by analogy to the effects of ultraviolet radiation one would expect that higher energy radiation would cause degradation of olefin copolymers containing ketone groups, I have found the reverse to be the case and such copolymers will build up in molecular weight rather than break down when subjected to the action of high energy radiation. Ultraviolet radiation and high energy radiation can be distinguished as follows. All radiation whether electromagnetic (e.g. light) or particulate (e.g. electron beams) may be characterized by a wavelength λ or an energy E per quantum which can be expressed in electron volts (e.v.). The range of values of λ and E for three types of radiation are indicated in Table I below.

TABLE 1
[Energy and wavelength of radiation]

| Radiation | Wavelength range (cm) | Energy range (e.v.) |
|---|---|---|
| Ultraviolet | $0.2$–$4.0 \times 10^{-5}$ | $100$–$3$ |
| Gamma rays | $10^{-11}$–$10^{-9}$ | $10^7$–$10^5$ |
| Electron beams | $10^{-11}$–$10^{-8}$ | $10^8$–$10^4$ |

It will be seen that ultraviolet radiation involves relatively low energies (3–100 e.v.) whereas gamma rays and electron beams are characterized by energies per quantum of about 100,000 to about 100,000,000 e.v. All radiation having energies in this range is referred to herein as "high energy radiation."

As mentioned above it has now been found that olefin copolymers containing ketone groups build up in molecular weight when subjected to high energy radiation. Indeed, as compared to polyolefins not containing ketone groups, there is substantial improvement in the radiation efficiency where the polymer to be irradiated includes, in the back bone or in side chains or in both, from 0.01 to 50 mole percent of ketone groups, but the range of ketone groups will normally be between about 0.1 and 10 mole percent. The presence of these ketone groups, even in very low concentrations, apparently increases the efficiency of the interaction of the high energy radiation with the plastic to such an extent that many more cross-links are formed than in a polymer of similar molecular weight but containing no ketone groups. Thus by the present invention it is possible to reduce the amount of high energy radiation to produce the desired improvement in properties or alternatively to achieve a greater improvement in properties of the product with the same dose of radiation. The cost of the irradiation process can be reduced because one can use faster production rates and less electrical energy to produce the desired properties.

According to the invention, an olefin copolymer is prepared with carbon monoxide or a ketone-containing vinyl monomer. Pololefins containing between about 0.1 and 5 mole percent of ketone groups have all the desirable properties of unmodified polyolefins and can in general be used in all of the applications suitable for the unmodified polyolefins. By the process of the invention, the olefin copolymer is then fabricated into a molded object, a fibre or a film by conventional molding or extrusion processes, and subsequently or during the molding or extrusion process is treated with high energy radiation from a suitable source, such as a cobalt-60 γ-cell, an electron beam generator, an atomic pile, or other source of high energy radiation. The length of time of the irradiation and the intensity are adjusted to give the desired improvement to the physical properties of the resin. In general the degree of improvement depends on the radiation dose, being greater the larger the dose of radiation to which the sample is subjected. Doses from one to 50 megarads can be used to advantage in the process of this invention. The products of the invention may vary from tough, rubberlike plastic materials to hard, rigid resins depending to a large extent on the nature of the copolymer which is subjected to the high energy radiation and the dose of radiation applied.

The invention is particularly applicable to branched polyethylene because there is no difficulty in including ketone monomers therein. There is greater difficulty with other polyolefins, but ketone monomers may be included by block or graft copolymerization and if this is successful subsequent irradiation with high energy radiation will improve the cross-linking. Although the reason for the improvement cannot be stated conclusively, hydrocarbons are relatively inert to radiation, and the high energy radiation appears to localize in the ketone groups rendering them more efficient in producing free radicals which are available for cross-linking. To amplify the theory, when high energy radiation such as a γ-ray is absorbed by a polymer, a substantial portion of the total energy is used up in producing electrons of lower energy by Compton scattering. A relatively large number of such Compton electrons may be formed from a single γ-ray. These electrons may then collide with atoms in the molecule, which atoms are thereby raised to an excited state. Chemical reactions occur from these excited states. The amount of chemical reaction occurring depends on various factors, such as the ease of formation of the state, the lifetime of the state, and the case of reaction from the state. It is well known that hydrocarbon groups generally are relatively inert to high energy radiation. Thus, a high dose is required to obtain the desired degree of chemical reaction. On the other hand the ketone carbonyl appears to be particularly effective in causing chemical reaction, particularly in the formation of free radicals which are believed to be the intermediates involved in the cross-linking of polyethylene. Thus the reaction tends to be concentrated in the region of the carbonyl group even when these are present in relatively small amounts. This causes an enhancement of the cross-linking reaction when the ketone carbonyl is present in the polymer chain.

It is known that certain compounds may be added to polyolefin films to improve the efficiency of radiation cross-linking. For example Odian, Bernstein, Schaeffer, Friedman and Kelly (U.S. Atomic Energy Commission NYU–2481 (1961)) showed that polyethylene can be cross-linked at lower radiation doses when di and polyfunctional monomers are admixed with the polymer. Useful monomers are ethylene glycol dimethacrylate, polyethylene glycol dimethacrylate, triallyl cyanurate and allyl methacrylate. Since such monomers react by a free-radical mechanism, the use of polyolefins containing ketone groups with such additives by the process of the present invention should show an even greater efficiency for radiation cross-linking. In general additives which improve the efficiency of radiation cross-linking of pure polyolefins can be expected to be even more effective when used with ketone-containing polyolefins such as the ethylene-carbon monoxide copolymers.

Similarly the invention is applicable to other olefin copolymers such as copolymers of ethylene and vinyl acetate with carbon monoxide. Preferably the copolymer includes at least 90 mole percent olefin and 0.1 to 5 mole percent of ketone groups. The ketone-containing copolymers can be made by any known method, for example by the methods disclosed in the following patent specifications: U.S. 2,495,286; U.S. 2,519,791; U.S. 2,557,256; U.S. 2,391,920 and U.S. 2,405,950.

To produce a shrinkable film the olefin copolymer is extruded as a film, is exposed to high energy radiation while in the molten or partially solid state, and is then stretched. The film can be wrapped around an object such as a food product (for example, poultry or meat) or an electrical connection, and its temperature is then raised until the cross-linking causes it to shrink snugly around the object. Film produced according to the invention can be free of toxic or extractable additives which must be avoided in food processing. This is in contrast to polyolefin films which have been cross-linked by use of curatives, such as peroxy or azo compounds, and which therefore contain residues derived from such curatives.

DESCRIPTION OF THE PREFERRED EMBODIMENTS

The process and products of the invention are illustrated in but not restricted by the following examples.

Example 1

A series of copolymers of ethylene and carbon monoxide were prepared by a high pressure continuous polymerization process of the kind described in British Pat. 471,590 dated Sept. 6, 1937 to Fawcett, Gibson, Perrin, Paton, Williams and I.C.I., including small amounts of carbon monoxide in the ethylene fed to the reactor. By controlling the pressure of the reactor the melt index of the sample was maintained at 2. By this procedure, samples containing 0.1, 0.5 and 1.0 mole percent of carbon monoxide, as determined by analysis of reactants and products, were prepared. For comparison, a sample containing no carbon monoxide was also prepared. The polymer samples were extruded and chopped into pellets. These polymers were characterized by having a melt index of 2, an approximate viscosity molecular weight of 22,000 and a melting range from 90 to 120° C. Those containing carbon monoxide exhibited a strong absorption band in the infra-red at a wavelength of 5.8 mμ and a broad absorption in the ultraviolet with a maximum around 290 mμ. The intensity of the absorption was proportional to the amount of carbon monoxide in the polymer. These bands are characteristic of ketone carbonyl groups.

The pellets were dried, extracted with hexane to remove any anti-oxidant that might be present, and sealed in glass tubes under vacuum for the irradiation experiments. The sealed tubes were irradiated for various times in a 20,000 Curie cobalt-60 γ-source to provide doses ranging from 0.5 to 2 megarads. Viscosity measurements were then made in Tetralin at 80° C. The molecular weights were calculated from the viscosity measurements according to the following relation:

$$[\eta] = 2.21 \times 10^{-3} M^{0.6}$$

where $[\eta]$ is the intrinsic viscosity and M is the molecular weight. The results of a series of experiments are shown in Table II below.

TABLE II

| Dose (megarads) | Time (minutes) | Intrinsic viscosity in Tetralin at 80° C. | | | | Viscosity, average molecular wt. | | | |
|---|---|---|---|---|---|---|---|---|---|
| | | 0% CO | 0.1% CO | 0.5% CO | 1.0% CO | 0% CO | 0.1% CO | 0.5% CO | 1.0% CO |
| 0 | 0 | 0.89 | 0.89 | 0.89 | 0.88 | 21,850 | 22,400 | 21,850 | 21,600 |
| 0.5 | 45.9 | 0.95 | | | 1.06 | 24,300 | | | 29,500 |
| 0.65 | 61.0 | | 1.02 | 1.07 | | | 28,000 | 30,200 | |
| 0.78 | 72.0 | | | | 1.21 | | | | 36,700 |
| 0.82 | 77.0 | | 1.06 | 1.16 | | | 29,500 | 34,600 | |
| 1.00 | 91.6 | 1.02 | | | 1.42 | 28,000 | | | 48,000 |
| 1.11 | 103.0 | | 1.13 | 1.26 | | | 33,200 | 39,400 | |
| 1.41 | 131.0 | | 1.34 | 1.58 | | | 43,500 | 57,000 | |
| 1.5 | 140.0 | | 1.44 | | | | 49,000 | | |
| 1.9 | 176.6 | 1.22 | | | | 37,600 | | | |

It is well known that the rate of formation of cross-links for polymers having the same starting molecular weight is proportional to the slope of the line obtained by plotting the reciprocal of the molecular weight as a function of the irradiation dose. The results of such an analysis are shown in Table III below.

TABLE III

| Concentration of carbon monoxide in copolymer (mole percent): | Relative rate of formation of cross-links |
|---|---|
| 0 | 1.00 |
| 0.1 | 1.61 |
| 0.5 | 2.19 |
| 1.0 | 2.95 |

From these results it can be seen that the inclusion of only 1.0 mole percent carbon monoxide in the ethylene copolymer increases the rate of formation of cross-links by a factor of about 3 and even 0.1 mole percent carbon monoxide causes an increase of about 60% in the radiation efficiency for the process. Polyethylene containing amounts of carbon monoxide of 1 mole percent or less have physical properties essentially indistinguishable from those of pure polyethylene. Consequently these polymers can be used in all applications for which high pressure polyethylene is now used.

Example 2

Viscosity measurements cannot be used to estimate the efficiency of cross-linking after the polymer becomes insoluble because of cross-linking. However, estimates of the efficiency of cross-linking on insoluble polymers can be made by measuring the relative amounts of gel and sol produced in the irradiation. In general, the higher the amount of gel fraction and the lower the amount of soluble fraction the higher is the amount of cross-linking. Films were pressed from unextracted pellets prepared (but not irradiated) as described in Example 1 by molding the pellets in a Carver press at a temperature of 140° C. and a pressure of 20,000 lbs. per square inch. The films were 5 mils thick and were placed in glass tubes and irradiated in the presence of air at doses exceeding the gel dose. The sol fraction was obtained by extracting the film after irradiation with toluene for 48 hours. The results are given in Table IV below.

TABLE IV
[Gel fractions for irradiated polymers]

| Radiation dose | Mole percent CO | | |
|---|---|---|---|
| | 0 | 1.0 | 5.3 |
| 7.8 megarads | 12% | 18% | 63% |
| 13.5 megarads | 12% | 56% | 92% |

Example 3

A copolymer of ethylene was prepared by injecting methyl-vinyl-ketone into the ethylene feed in a continuous high pressure reactor. By adjustment of the concentration of methyl-vinyl-ketone a polymer was prepared containing 1 mole percent of methyl-vinyl-ketone (i.e. 1 mole percent of ketone groups). A film was prepared by compression molding of the pellets, as in Example 2, and irradiated in a cobalt-60 $\gamma$-cell to a dose of 10 megarads. The gel fraction of this polymer was 69% compared to 12% for a polymer of similar molecular weight containing no ketone groups.

Example 4

A copolymer of ethylene and methylisopropenyl ketone was prepared by a similar procedure to that of Example 3 containing 0.5 mole percent methylisopropenyl ketone. Irradiation in a $\gamma$-cell to a dose of 10 megarads gave a tough insoluble film which did not melt below its decomposition point and contained 86% insoluble polymer.

Example 5

The polymers described in Example 1 were irradiated in the beam of a 0.5 mev. Van de Graaf accelerator to a dose of 10.5 megarads. The gel fraction was then determined by extraction in hot toluene. The results are given in Table V below.

TABLE V

| CO content (mole percent): | Gel fraction (percent) |
|---|---|
| 0 | 13 |
| 0.1 | 21 |
| 0.5 | 35 |
| 1.0 | 65 |

Example 6

A film was pressed from a 1 mole percent ethylene carbon monoxide copolymer using a Carver Press at a temperature of 150° C. and 15,000 p.s.i. The thickness of the resulting film was approximately 2.5 mils. The film was then irradiated in the cobalt-60 source to a dose of 3.5 megarads. It was then stretched at a temperature of 50° C. to approximately twice its original length. A portion of the film was wrapped around a 12 gauge copper wire and then warmed with a hot air gun to approximately 100° C. The film shrank to form a tight bond with the metallic conductor. Biaxial stretching of the irradiated film caused the film to shrink in both directions.

Example 7

A graft copolymer of methyl-vinyl-ketone on polypropylene was prepared by the following procedure: Ten grams of finely-divided polypropylene powder was irradiated under vacuum in a Pyrex tube in the cobalt-60 $\gamma$-source to a dose of 2 megarads. The tube was then attached to a vacuum line, and 10 grams of pure methyl-vinyl-ketone (MVK) were distilled into the tube under vacuum. The tube was allowed to remain overnight at room temperature (25° C.), then the unpolymerized MVK was removed by vacuum distillation. The polymer powder was then extracted with acetone in a Soxhlet extractor to remove any ungrafted poly MVK. The resulting powder was pressed into a thin film in a Carver press at 140° C.

Based on the intensity of the infra-red band at 5.7 m$\mu$ it was estimated that the polymer contained 8.5 mole percent grafted MVK. Samples of the film were irradiated in vacuum at doses of 5 and 10 megarads along with a control sample of pure polypropylene film. The gel fractions were then determined by extraction in hot toluene. The values obtained are listed in Table VI below.

TABLE VI

| Material | Dose (megarads) | Gel fraction (percent) |
|---|---|---|
| Polypropylene | 5 | 0 |
| | 10 | 3 |
| MVK-polypropylene graft copolymer | 5 | 21 |
| | 10 | 54 |

What I claim as my invention is:

1. The process of cross-linking an olefin copolymer containing at least about 0.1 mole percent and no more than about 5 mole percent keto groups and selected from the group consisting of a copolymer consisting essentially of a lower mono-olefin with carbon monoxide and a copolymer consisting essentially of a lower mono-olefin with a keto group-containing vinyl monomer, which comprises irradiating the copolymer with radiation having an energy per quantum of 100,000 to 100,000,000 electron volts, the dose of irradiation being at least 0.5 megarads.

2. The process of producing a cross-linked polymer which comprises copolymerizing monomers consisting essentially of a lower mono-olefin and carbon monoxide or a keto group-containing vinyl monomer whereby the resulting copolymer contains at least about 0.1 mole percent and no more than about 5 mole percent keto groups, and irradiating the copolymer with radiation having an energy per quantum of 100,000 to 100,000,000 electron volts, the dose of irradiation being at least 0.5 megarads.

3. The process of claim 2 wherein the copolymer contains at least 90 mole percent olefin and about 0.1 to 5 mole percent ketone groups, and irradiating the copolymer with radiation having an energy per quantum of 100,000 to 100,000,000 electron volts.

4. The process of claim 3 wherein the copolymer is an ethylene-carbon monoxide copolymer.

References Cited

UNITED STATES PATENTS

| | | | |
|---|---|---|---|
| 3,162,623 | 12/1964 | Cairns et al. | 260—63 R |
| 3,530,109 | 9/1970 | Fenton | 260—63 CO |
| 3,057,791 | 10/1962 | Anderson | 204—159.14 |
| 2,921,006 | 1/1960 | Schmitz et al. | 204—159.15 |

FOREIGN PATENTS

| | | | |
|---|---|---|---|
| 527,219 | 7/1956 | Canada | 260—63 CO |

MURRAY TILLMAN, Primary Examiner

R. B. TURER, Assistant Examiner

U.S. Cl. X.R.

260—63 UO, 63 UY